US007880374B2

(12) United States Patent
Tokai et al.

(10) Patent No.: US 7,880,374 B2
(45) Date of Patent: Feb. 1, 2011

(54) DISPLAY DEVICE INCLUDING GAS DISCHARGE TUBES SANDWICHED BETWEEN A FRONT SUPPORT MEMBER AND REAR SUPPORT MEMBERS

(75) Inventors: Akira Tokai, Kawasaki (JP); Manabu Ishimoto, Kobe (JP); Hitoshi Hirakawa, Kobe (JP); Yosuke Yamazaki, Kobe (JP); Koji Shinohe, Kobe (JP); Kenji Awamoto, Kobe (JP)

(73) Assignee: Shinoda Plasma Co., Ltd., Kobe (JP)

( * ) Notice: Subject to any disclaimer, the term of this patent is extended or adjusted under 35 U.S.C. 154(b) by 390 days.

(21) Appl. No.: 11/979,927

(22) Filed: Nov. 9, 2007

(65) Prior Publication Data

US 2008/0061691 A1 Mar. 13, 2008

Related U.S. Application Data

(63) Continuation of application No. PCT/JP2005/008701, filed on May 12, 2005.

(51) Int. Cl.
*H01J 17/49* (2006.01)
*G02F 1/33* (2006.01)

(52) U.S. Cl. ....................... 313/493; 313/587; 313/586; 445/24

(58) Field of Classification Search ....................... None
See application file for complete search history.

(56) References Cited

U.S. PATENT DOCUMENTS 5,984,747 A 11/1999 Bhagavatula et al.
6,509,941 B2 * 1/2003 Freidhoff et al. .............. 349/73
6,836,064 B2 12/2004 Yamada et al.
2003/0214224 A1 * 11/2003 Awamoto et al. ........... 313/485
2004/0108813 A1 * 6/2004 Tokai et al. ................. 313/582
2006/0082301 A1 * 4/2006 Okafuji et al. .............. 313/582

FOREIGN PATENT DOCUMENTS

| | | |
|---|---|---|
| EP | 0518132 | 12/1992 |
| JP | 5-82101 | 4/1993 |
| JP | 11-3649 | 1/1999 |
| JP | 11-162358 | 6/1999 |
| JP | 2003-86141 | 3/2003 |
| JP | 2003-272562 | 9/2003 |
| JP | 2004-178854 | 6/2004 |

* cited by examiner

*Primary Examiner*—Nimeshkumar D Patel
*Assistant Examiner*—Tracie Green
(74) *Attorney, Agent, or Firm*—Staas & Halsey LLP

(57) ABSTRACT

A display device (10) includes a plurality of gas discharge tubes (11R, 11G, 11B, . . . ) sandwiched between a front support plate (31) and a plurality of rear support plates (321, 322, . . . 328). The display device further includes: a plurality of display electrodes (2) formed on a surface of the front support plate facing the plurality of gas discharge tubes to extend across tube axes of the plurality of gas discharge tubes; a plurality of signal electrodes (3) formed on surfaces of the plurality of rear support plates facing the plurality of gas discharge tubes to extend along the longitudinal direction of the plurality of gas discharge tubes. Another rear support plate (330) for supporting the plurality of rear support plates is disposed on surfaces of the plurality of rear support plates opposite to the surfaces facing the plurality of gas discharge tubes.

9 Claims, 8 Drawing Sheets

DISPLAY DEVICE INCLUDING GAS DISCHARGE TUBES SANDWICHED BETWEEN A FRONT SUPPORT MEMBER AND REAR SUPPORT MEMBERS

This application is a continuation application of international application PCT/JP2005/008701 filed May 12, 2005.

FIELD OF THE INVENTION

The present invention relates generally to a display device, and more particularly to a display device having a plurality of thin elongated gas discharge tubes in parallel for displaying any types of pictures.

BACKGROUND ART

Japanese Patent Application Publication JP 2003-86141-A proposes a display device, which includes gas discharge tubes disposed side by side, and in which a gas discharge is produced by application of a voltage through external electrodes, whereby light is emitted from phosphors within the tubes.

Such a display device includes: gas discharge tubes, each containing a discharge gas and having a phosphor layer therein, two supports contacting and supporting the gas discharge tubes, and a plurality of electrodes disposed on the surfaces of the supports facing the gas discharge tubes for externally applying a voltage to the discharge tubes to cause a discharge to take place within the discharge tubes to thereby provide picture display.

DISCLOSURE OF THE INVENTION

It is desirable that the precision of the registration of the signal or address electrodes and the gas discharge tubes of such a display device should be as high as possible. However, achievement of such high precision requires complicated manufacturing process, causing the manufacturing cost to increase.

In order to simplify the process for manufacturing conventional display devices, registration between the signal electrodes and the gas discharge tubes is achieved in a simple manner by forming the signal electrodes at predetermined intervals on the rear support and arranging the gas discharge tubes on the rear support in such a manner as to make adjacent gas discharge tubes contact with each other. However, dimensions of the gas discharge tubes vary, and hence a cumulative error in the tube width may cause undesirable misregistration between the signal electrodes and the gas discharge tubes. On the other hand, if the gas discharge tubes and the address electrodes are accurately registered before bonding them, the number of steps for bonding increases, which increases the manufacturing cost.

The inventors have recognized that there is a need for achieving registration between the signal electrodes and the gas discharge tubes at a low cost.

An object of this invention is to achieve registration between signal electrodes and gas discharge tubes at a low cost.

Another object of the invention is to secure good contact between the signal electrodes and the gas discharge tubes.

SUMMARY OF THE INVENTION

In accordance with an aspect of the present invention, a display device includes a plurality of gas discharge tubes sandwiched between a front support plate and a plurality of rear support plates. The display device further includes: a plurality of display electrodes formed on a surface of the front support plate facing the plurality of gas discharge tubes to extend across tube axes of the plurality of gas discharge tubes; a plurality of signal electrodes formed on surfaces of the plurality of rear support plates facing the plurality of gas discharge tubes to extend along the longitudinal direction of the plurality of gas discharge tubes; and another rear support plate for supporting the plurality of rear support plates. The other rear support plate is disposed on surfaces of the plurality of rear support plates opposite to the surfaces facing the plurality of gas discharge tubes.

According to the invention, a display device including a rear support allows registration between its signal electrodes and gas discharge tubes at a low cost, and good contact between the signal electrodes and the gas discharge tubes can be secured.

DESCRIPTION OF THE PREFERRED EMBODIMENTS

The invention will be described with reference to the accompanying drawings. Throughout the drawings, similar symbols and numerals indicate similar items and functions.

Figure 1:
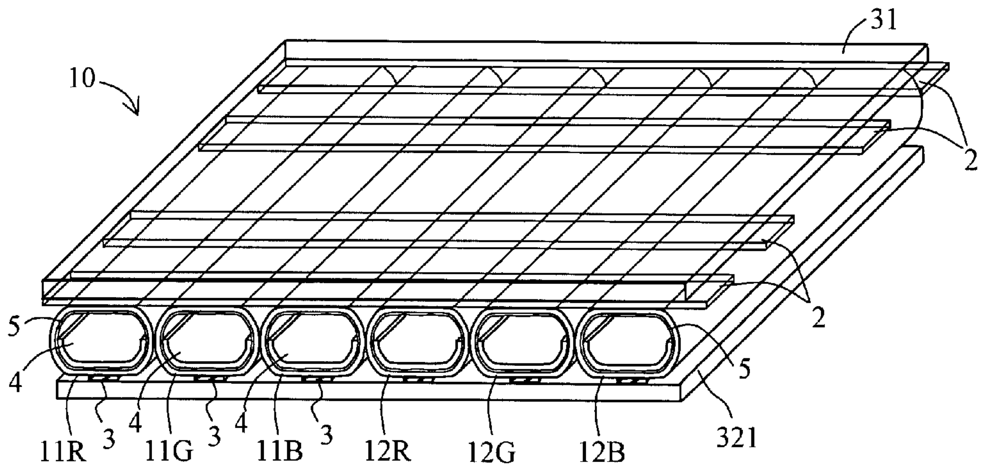
FIG. 1 shows an example of the structure of part of a large display device, in accordance with an embodiment of the present invention.

FIG. 1 shows an example of the structure of part of a large display device 10, in accordance with an embodiment of the present invention. In FIG. 1, the display device 10 includes a plurality of thin, elongated gas discharge tubes 11R, 11G, 11B, 12R, 12G, 12B, . . . , disposed in parallel with each other, a front support 31 composed of a transparent front support sheet or thin plate, a rear block support 321 composed of an opaque rear support sheet or thin plate, which may be, for example, white, ivory or gray, a plurality of display electrode pairs 2, and a plurality of signal electrodes 3. The front support 31 and the rear block support 321 are made of, for example, flexible or elastic film or sheet, which may be, for example, PET sheet or glass. On the other hand, it is preferred that the block support 321 is made of a high-reflectivity material and has a low dielectric constant.

The gas discharge tube 11R, 11G, 11B, . . . is formed of a transparent insulating material, e.g. borosilicate glass, and, typically, has a tube diameter of 2 mm or smaller and a tube length of 300 mm or larger.

Typically, phosphor support members having respective red, green and blue (R, G, B) phosphor layers formed or deposited thereon are inserted into the interior discharge spaces of the thin gas discharge tubes 11R, 11G, 11B, . . . , respectively. Discharge gas is introduced into the interior discharge space of each gas discharge tube, and the gas discharge tube is sealed at its opposite ends. An electron emissive film 5 of MgO is formed on the inner surface of the gas discharge tube 11R, 11G, 11B, . . . , and a support member with a phosphor layer 4 formed thereon is disposed within the gas discharge tube 11R, 11G, 11B, . . . . Alternatively, the phosphor layer 4 may be formed or deposited on the inner surface of an associated gas discharge tube without using the support member. The signal electrodes 3 are formed on the rear support sheet 32 and extend along the longitudinal direction of the respective discharge tubes 11R, 11G, 11B, . . . .

The support member is formed of a transparent insulating material, e.g. borosilicate glass, and has the phosphor layer 4 formed thereon. The support member may be disposed within the glass tube by applying a paste of phosphor over the support member outside the glass tube and then baking the phosphor paste to form the phosphor layer 4 on the support member, before inserting the support member into the glass tube. As the phosphor paste, a desired one of various phosphor pastes known in this technical field may be employed.

The electron emissive film 5 emits charged particles, when it is bombarded with the discharge gas having energy above a given value. When a voltage is applied between the pair of display electrodes 2, the discharge gas contained in the tube is excited. The phosphor layer 4 emits visible light by converting thereinto vacuum ultraviolet radiation generated in the de-excitation process of the excited rare gas atoms.

Figure 2A:
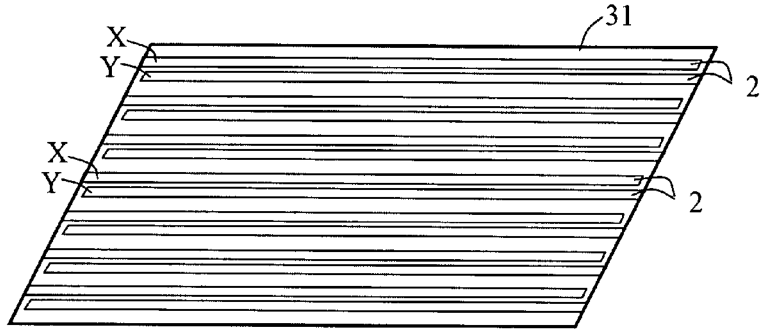
FIG. 2A shows the transparent front support with the plurality of pairs of display electrodes formed thereon.
Figure 2B:
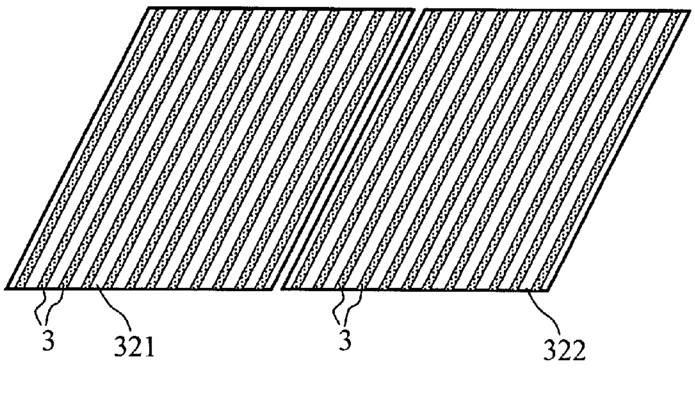
FIG. 2B shows the rear block supports with the plurality of signal electrodes formed thereon.

FIG. 2A shows the transparent front support 31 with the plurality of pairs of display electrodes 2 formed thereon. FIG. 2B shows the rear block supports 321 and 322 with the plurality of signal electrodes 3 formed thereon. The electrodes 3 are formed on the front or inner surfaces of the rear block supports 321 and 322 and extend along the longitudinal direction of the gas discharge tubes 11R, 11G, 11B, . . . . The pairs of display electrodes 2 are formed on the rear or inner surface of the front support 31 and extend in the direction across the signal electrodes 3. A non-discharging region is secured between each display electrode pair 2 and the adjacent display electrode pair 2. It is preferable that the pairs of display electrodes have high transmissivity. As a technique for increasing the transmissivity, it is known to use meshed metal electrodes or to form a metal electrode and a transparent electrode formed of, for example, a NESA film, put on one another, which technique can be employed in the present invention.

The signal electrodes 3 and the pairs of display electrodes 2 are brought into intimately contact respectively with the lower and upper peripheral surfaces of the gas discharge tubes 11R, 11G, 11B, . . . , when the display device 10 is assembled. In order to provide better contact, an electrically conductive adhesive may be placed between the display electrodes and the gas discharge tubes.

In plan view of the display device 10 seen from the front side, the intersections of the signal electrodes 3 and the pairs of display electrodes 2 provide unit light-emitting regions. Display is provided by using either one electrode of each pair of display electrodes 2 as a scanning electrode, generating a selection discharge at the intersection of the scanning electrode with the signal electrode 3 to thereby select a light-emitting region, and generating a display discharge between the pair of display electrodes 2 using the wall charge formed by the selection discharge on the region of the inner tube surface at the selected region, which, in turn, causes the associated phosphor layer to emit light. The selection discharge is an opposed discharge generated within each gas discharge tube 11R, 11G, 11B, . . . between the vertically opposite scan electrode and signal electrode 3. The display discharge is a surface discharge generated within each gas discharge tube 11R, 11G, 11B, . . . between the two display electrodes of each pair of display electrodes disposed in parallel in a plane.

The pair of display electrodes 2 and the signal electrode 3 can generate discharges in the discharge gas within the tube by applying voltages between them. The electrode structure of the gas discharge tube 11 shown in FIG. 1 is such that the three electrodes are disposed in one light-emitting region, and that the discharge between the pair of display electrodes generates a discharge for display. However, the electrode structure is not limited to such a structure. A display discharge may be generated between the display electrode 2 and the signal electrode 3. In other words, an electrode structure of a type employing a single display electrode may be employed instead of each pair of display electrodes 2, in which the single display electrode 2 is used as a scanning electrode so that a selection discharge and a display discharge (opposed discharge) are generated between the single display electrode 2 and the signal electrode 3.

Figure 3:
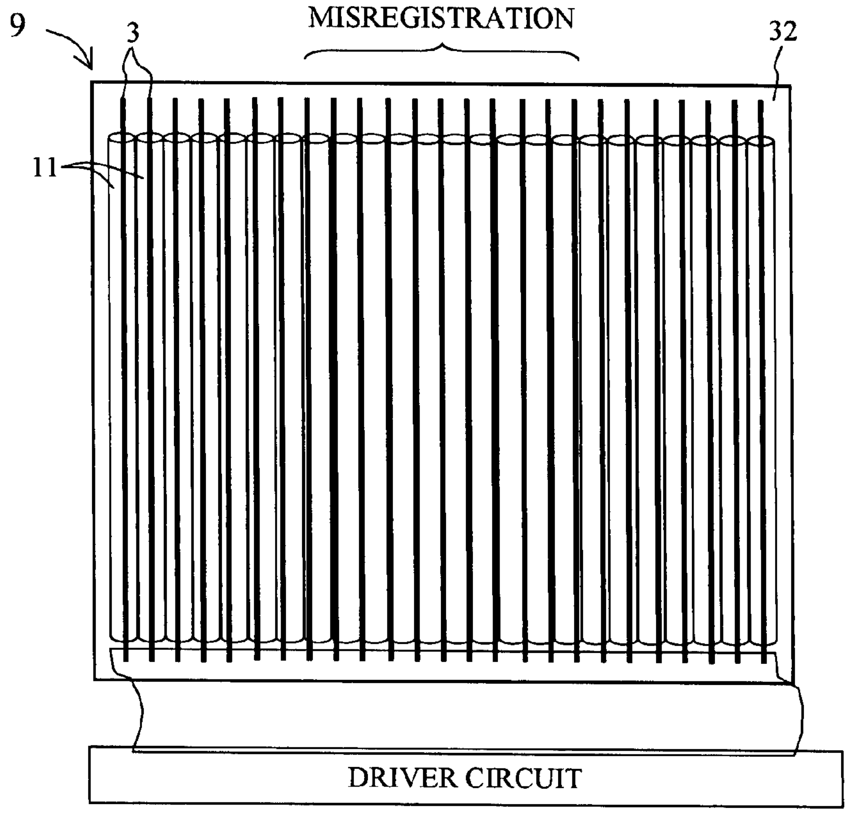
FIG. 3 is useful for explaining how misregistration of the address or signal electrodes formed on the rear support and the gas discharge tubes in a prior art display device can be generated.

FIG. 3 is useful for explaining how misregistration of the address or signal electrodes 3 formed on the rear support 32 and the gas discharge tubes 11 in a prior art display device can be generated. When the plurality of gas discharge tubes 11 are disposed on the rear support 32 with the plurality of address or signal electrodes 3 formed thereon at predetermined intervals, e.g. at intervals equal to an ordinary tube diameter of the gas discharge tubes 11, undesirable misregistration between the address electrodes 3 and the gas discharge tubes 11 may be generated due to a cumulative error in tube width or tube diameter of the gas discharge tubes 11 because of variations in dimensions of the gas discharge tubes 11 from tube to tube. Typically, the variation in tube width is about 1% of the tube diameter. For example, for the tube width of 1 mm, there is an error of about ±0.005 mm or 0.01 mm. Undesirable misregistration between the address electrodes 3 and the gas discharge tubes 11 is seen in the center part of FIG. 3. Such misregistration may increase the threshold voltage for selection discharge, so that a proper selection discharge may not take place, which causes correct display not to be provided.

Figure 5A:
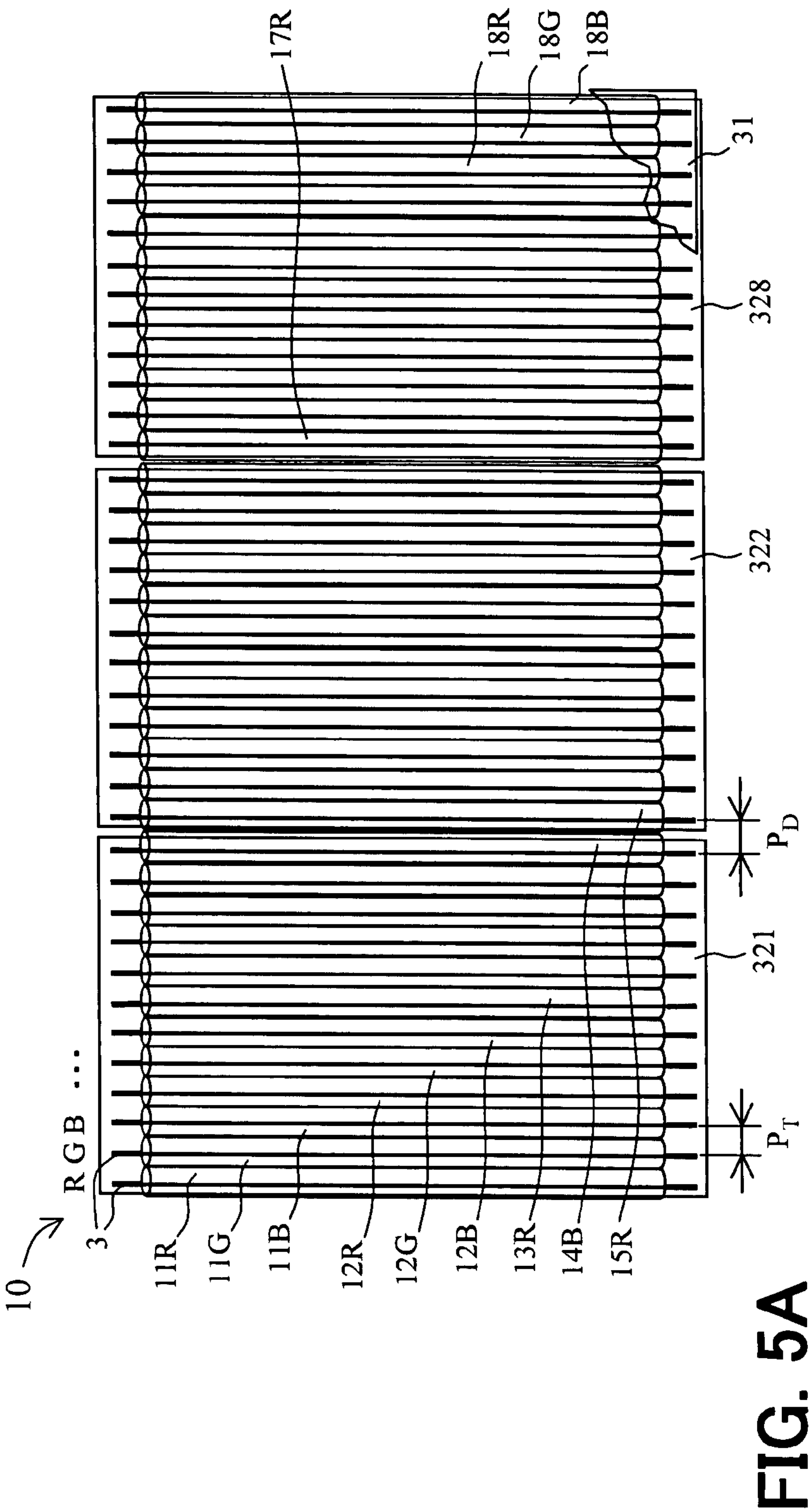
FIGS. 5A and 5B are a front view and a bottom view, respectively, of a display device arranged to eliminate the above-described misregistration, which includes a plurality of blocks of gas discharge tubes disposed on a plurality of rear block supports, respectively.
Figure 5B:
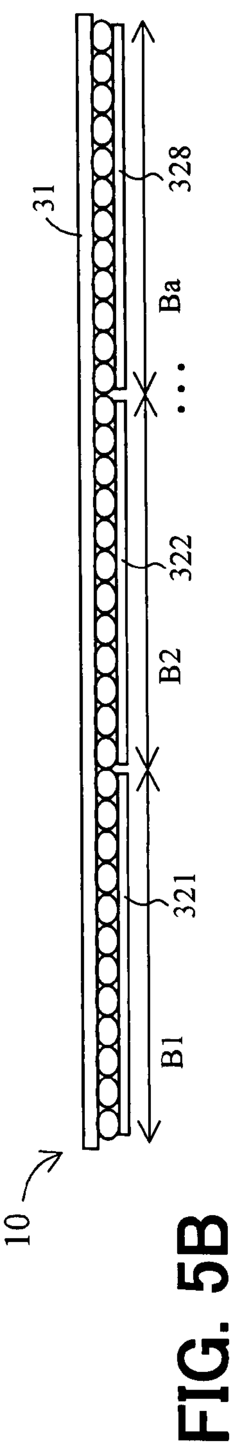

FIGS. 5A and 5B are a front view and a bottom view, respectively, of a display device 102 arranged to eliminate the above-described misregistration, which includes a plurality of blocks B1, B2, . . . , Ba of gas discharge tubes (11R, 11G, 11B, . . . , 14B), (15R, . . . ) and (17R, . . . , 18R, 18G, 18B)

disposed on a plurality of rear block supports 321, 322, 328, respectively. The plurality of rear block supports 321, 322, . . . , 328 are separated from each other, and a small gap is desirably disposed between edges of adjacent ones of the block supports. In some cases, the edges of adjacent block supports may overlap.

On each of the rear block supports 321, 322, 328, a plurality of signal electrodes 3 for a corresponding one of blocks B1, B2, . . . , Ba are disposed with a pitch $P_T$. On each of the plurality of rear supports 321, 322, . . . , or 328, one signal electrode block, consisting of 3× a signal electrodes 3 are formed, where a is an integer, which may be, for example, between 1 and 5 inclusive. In FIGS. 5A and 5B, the integer a=4. The distance $P_D$ between adjacent ones of the outermost signal electrodes 3 on adjacent ones of the rear block supports 321, 322, . . . , 328 may not be the pitch $P_T$.

Each block B1, B2, . . . , or Ba of the display device 10 is composed of a combination of one of the rear block supports 321, 322, . . . , and 328, with a corresponding one of the groups of gas discharge tubes (11R, . . . , 14B), (15R, . . . ), and (17R, . . . , 18B). All of the blocks B1, B2, . . . , Ba have substantially the same dimensions, shape and configuration.

The cumulative misregistrations between the respective ones of the signal electrodes 3 in each block and the associated gas discharge tubes (11R, . . . , 14B), (15R, . . . ), or (17R, . . . , 18B) can be absorbed by providing separations between the rear block supports 321, 322, . . . , and 328.

To assemble the display device 10, the gas discharge tubes in each group (11R, . . . , 14B), (15R, . . . ) or (17R, . . . , 18R) are disposed in group to contact each other on the corresponding signal electrodes 3 in the corresponding block B1, B2, . . . , or Ba on the rear block support 321, 322, . . . , or 328, and then bonded together. Then, the combinations of the respective rear block supports 321, 322, . . . , and 328 with the respective groups of gas discharge tubes (11R, . . . , 12B), . . . , and (17R, . . . , 18B) are bonded to the front support 31, to thereby complete one display device 10. In this way, the display device 10 can be manufactured with ease.

In the manner described above, the problem of misregistration between the plurality of the signal electrodes 3 and the gas discharge tubes (11R, . . . , 14B), . . . , or (17R, . . . , 18B) is dissolved. However, since the rear block supports 321, 322, . . . , and 328 are separated from each other, the structural strength in the rear side of the display device 10 is insufficient, and hence the display device 10 is rather weak in structure, in particular, low in structural unity in the rear portion. When the display device 10 is curved with the front side being concave, noticeable folds appear along the block boundaries in the front support 31.

Figure 6:
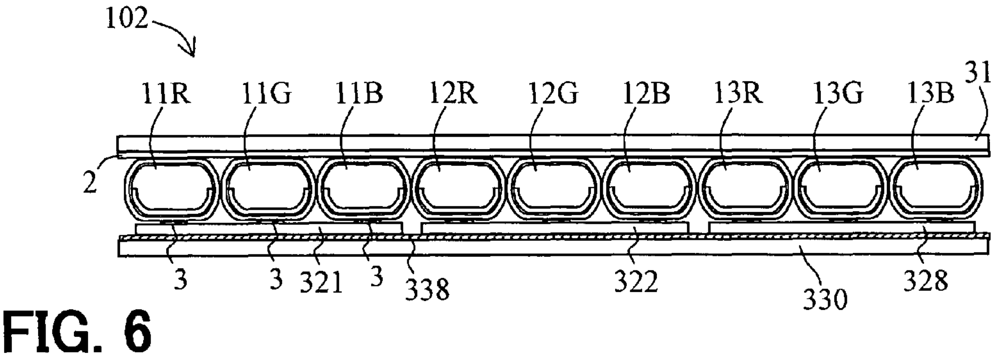
FIG. 6 shows the structure of a display device in accordance with an embodiment of the invention.

FIG. 6 shows the structure of a display device 102 in accordance with an embodiment of the invention. In the illustrated case, the number of the gas discharge tubes in each block is three (i.e., a=1) for simplicity of explanation. In this example, a broad, elastic second rear support 330 is secured, by bonding with an adhesive, to the rear surfaces of the plurality of rear block supports 321, 322, . . . , and 328. The rear support 330 has an adhesive layer 338 applied over the front surface thereof. Securing the rear block supports 321, 322, . . . , and 328 to the second rear support 330 increases the structural strength in the rear side of the display 102.

The rear block supports 321, 322, . . . , and 328 and/or the rear support 330 is white, ivory or gray in color, and the block supports 321, 322, . . . , 328 and/or the rear support 330 is formed of a material having high reflectivity. By reducing display light leaking through the rear side and causing more of the light toward the rear side to be reflected to the display surface side, the brightness of the display device can be increased. High reflectivity materials of the supports for that purpose include a white PET film, and a reflection film (ESR) available from Sumitomo 3M Limited.

It is preferable that the rear block supports 321, 322, . . . , and 328 and the rear support 330 have a low dielectric constant. This is so because, if the dielectric constant of the rear block supports 321, 322, . . . , and 328 and the rear support 330 is high, the electrostatic capacitance exhibited between the signal electrodes is large, resulting in large ineffective current flowing while the display device is driven. In order for the dielectric constant to be low, the material of the rear block supports 321, 322, . . . , and 328 and the rear support 330 may preferably be a film of a material having a dielectric constant lower than the dielectric constant of PET (polyethylene terephthalate), which is 3.2. Such materials include, for example, PP (polypropylene, which has a dielectric constant of 2.2), PPS (polyphenylene sulfide, which has a dielectric constant of 3.0), PC (polycarbonate, which has a dielectric constant of 2.9), and PEN (polyethylene naphthalate, which has a dielectric constant of 2.9). Alternatively, the rear block supports 321, 322, . . . , and 328 and the rear support 330 may be silicone rubber or a silicone sheet having a dielectric constant of from 2.9 to 3.1.

Figure 4:
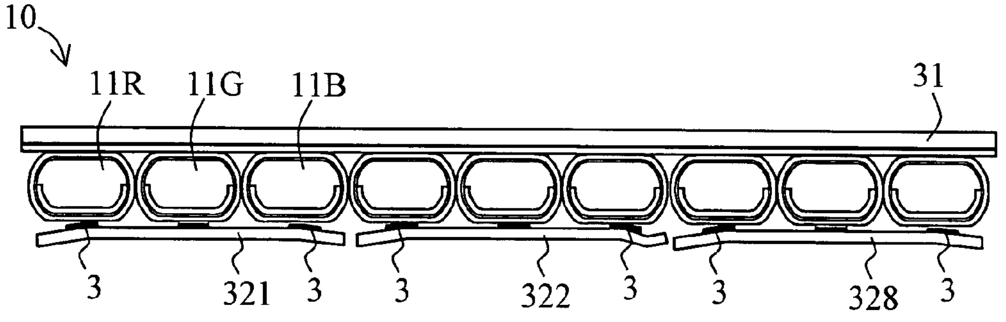
FIG. 4 is a bottom view of the display device composed of gas discharge tubes in a plurality of blocks disposed on the rear block supports, which have warps or distortions in the edge portions thereof.

FIG. 4 is a bottom view of the display device 10 composed of gas discharge tubes in a plurality of blocks disposed on the rear block supports 321, 322, . . . , and 328, which have warps or distortions in the edge portions thereof. The rear block supports 321, 322, . . . , and 328 have such edge warps or distortions, which are produced when the rear block supports 321, 322, . . . , and 328 are cut off or separated from a single sheet, and/or during working to bond the gas discharge tubes 11R, 11G, 11B, . . . , to the rear block supports 321, 322, . . . , and 328. Due to such warps or distortions in the edges, the signal electrodes 3 located near the edges of the rear block supports 321, 322, . . . , and 328 may be undesirably set back from the rear surfaces of the associated gas discharge tubes, or the contact of such signal electrodes 3 with the rear surfaces of the gas discharge tubes may be insufficient. If the signal electrodes 3 are not in intimate contact with the rear surfaces of the gas discharge tubes, the gas discharge tubes may not discharge normally.

Figure 7A:
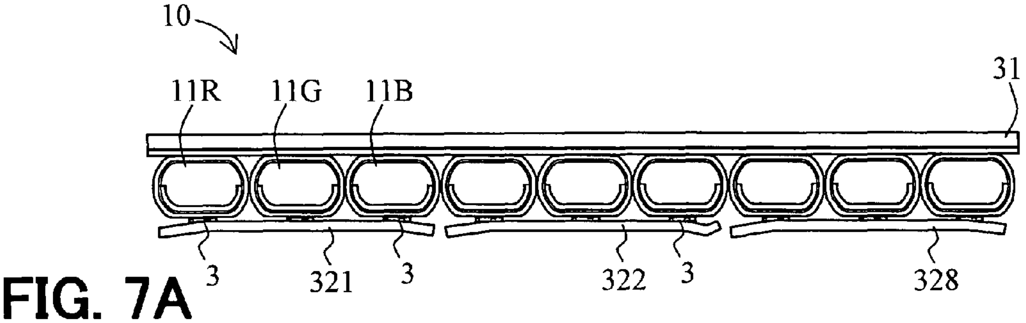
FIGS. 7A, 7B and 7C illustrate the structure of a display device in accordance with another embodiment of the invention, and a procedure for manufacturing the display device.
Figure 7B:
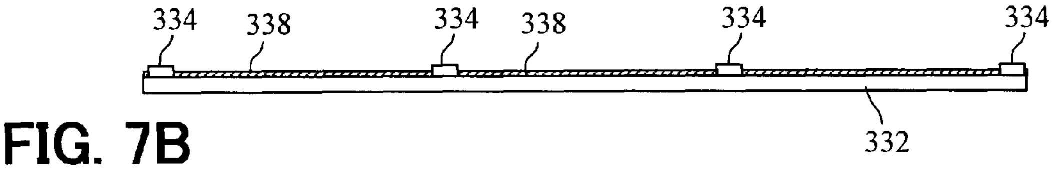
Figure 7C:
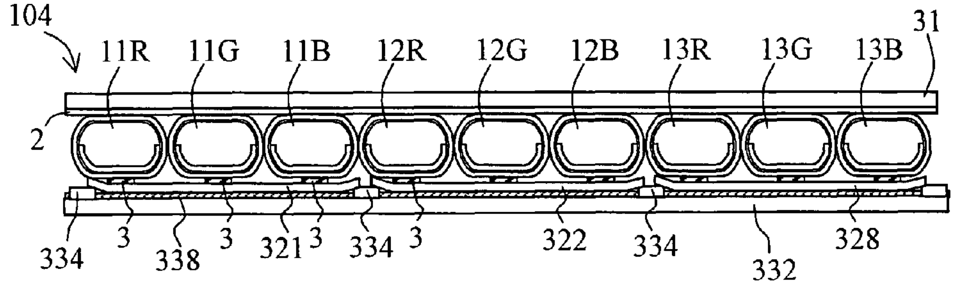

FIGS. 7A, 7B and 7C illustrate the structure of a display device 104 in accordance with another embodiment of the invention, and a procedure for manufacturing the display device 104.

As shown in FIG. 7A, a display device structure 10 composed of the front support 31, the gas discharge tubes 11R, 11G, 11B, . . . , and the rear block supports 321, 322, . . . , and 328, like the one shown in FIGS. 5A and 5B, is prepared. According to this embodiment, in place of the rear support 330 shown in FIG. 6, a rear support 332 is used. The rear support 332 includes elongated ridges or ribs 334 which are disposed at the respective block boundaries at regular intervals, and extend in the longitudinal direction of the gas discharge tubes. The ridges 334 may be divided into two or more sections at points along their length.

The ridges 334 of the rear support 332 may be of the same material, e.g. PET, as the rear support 332, and may be formed by bonding elongated films on the front-side surface or may be formed integral with the rear support 332. The ridges 334 may be formed, for example, by photolithography after applying a photosensitive material on the rear support 332 formed of a PET film. The ridges 334 may formed by applying an acrylic resin on the rear support 332 along the boundaries. The cross-section of the ridges 334 may be square, rectangular, semicircular or triangular. After that, as shown in FIG. 7B, an adhesive layer 338 is formed over the front-side surface of the rear support 332.

The rear surfaces of the rear block supports 321, 322, . . . , 328 of the display device structure 10 shown in FIG. 7A are bonded to the front surface of the rear support 332 of FIG. 7B, which results in the display device 104 as shown in FIG. 7C. In the display device 104, the edges of the rear block supports 321, 322, . . . , and 328 are bent toward the front side, being pressed by the ridges 334, so that the signal electrodes 3 near the edges are made to contact intimately with the rear surfaces of the corresponding gas discharge tubes 11R, 11B, 12R, . . . , 13B, whereby the gas discharge tubes can discharge normally.

Figure 8A:
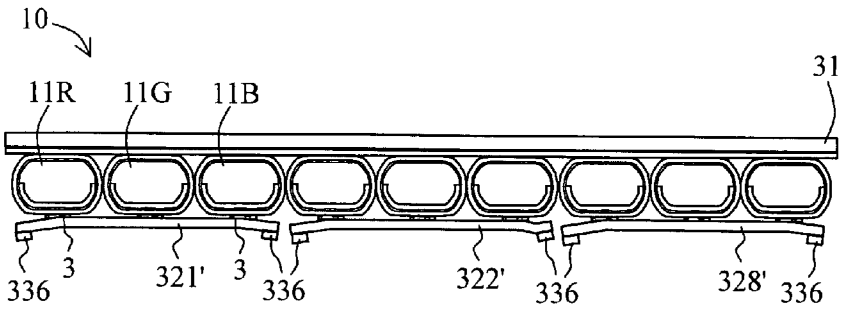
FIGS. 8A, 8B and 8C illustrate the structure of a display device in accordance with to a further embodiment, and also a procedure for manufacturing the display device.
Figure 8B:
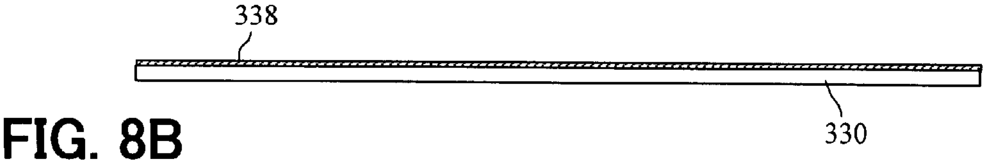
Figure 8C:
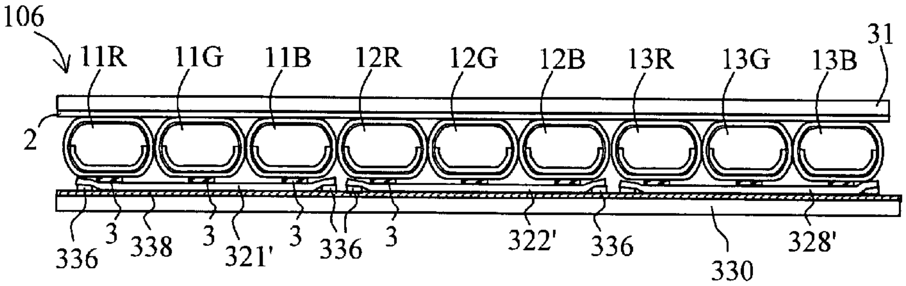

FIGS. 8A, 8B and 8C illustrate the structure of a display device 106 in accordance with to a further embodiment, and also a procedure for manufacturing the display device 106.

A display device structure 10 shown in FIG. 8A like the one shown in FIG. 7A is prepared. According to this embodiment, instead of forming the ridges 334 on the rear support 332 of FIG. 7B, rear block supports 321', 322', . . . , and 328' having elongated ridges or ribs 336 formed on the rear surface portions thereof along the block boundary edges are used.

The ridges 336 of the rear block supports 321', 322', . . . , 328' may be of the same material, e.g. PET, as the rear block supports 321', 322', . . . , 328'. Alternatively, the ridges 336 may be formed by bonding elongated films on the rear surfaces of the edge portions, or may be formed integral with the rear block supports 321', 322', . . . , 328'. The cross-section of the ridges 336 may be square, rectangular, semicircular or triangular. Then, as shown in FIG. 8B, the adhesive layer 338 is formed on the front-side surface of the rear support 330.

The rear surfaces of the rear block supports 321', 322', . . . , 328' of the structure shown in FIG. 8A are bonded to the front surface of the rear support 330 of FIG. 8B, which results in the display device 106 as shown in FIG. 8C. In the display device 106, the edges of the rear block supports 321', 322', . . . , 328' are bent toward the front surface side, being pressed by the ridges 336, so that the signal electrodes 3 near the edges are made to contact intimately with the rear surfaces of the corresponding gas discharge tubes 11R, 11B, 12R, . . . , 13B, whereby the gas discharge tubes can discharge normally.

Figure 9A:
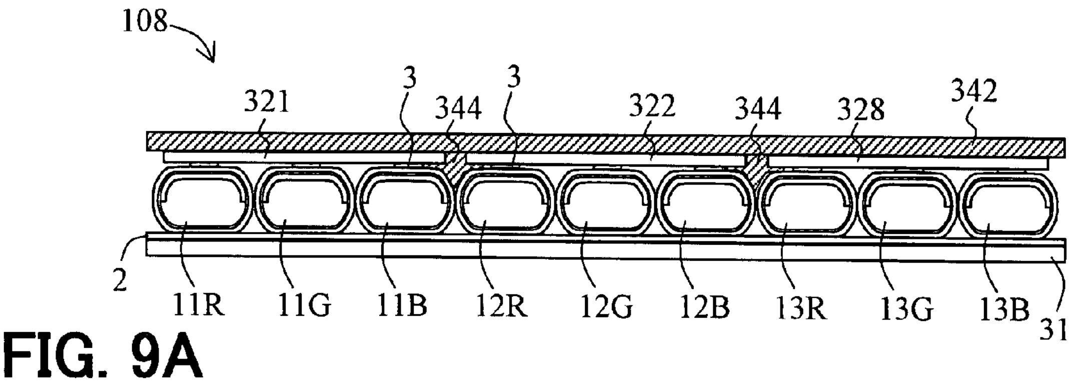
FIGS. 9A and 9B illustrate the structure of a display device in accordance with a still further embodiment of the invention.
Figure 9B:
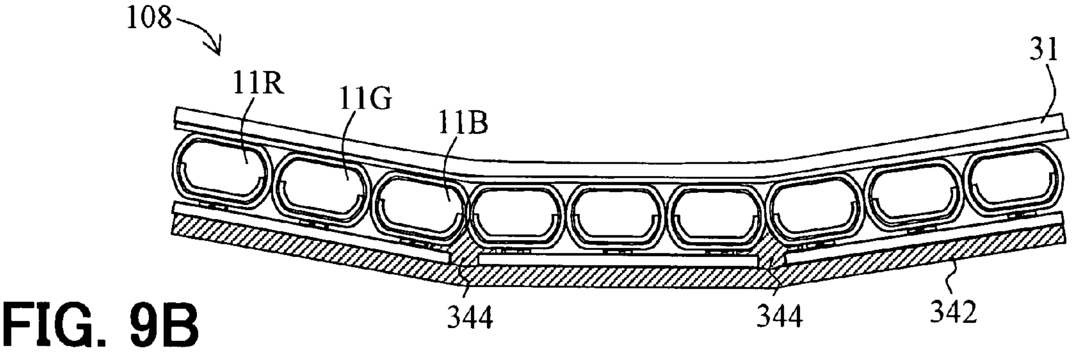

FIGS. 9A and 9B illustrate the structure of a display device 108 in accordance with a still further embodiment of the invention.

In FIG. 9A, a rear support 342 is made of a silicone rubber layer. According to this embodiment, silicone rubber fillers 344 are disposed in rear recesses formed between adjacent gas discharge tubes located along the edges of rear block supports 321, 322, . . . , 328. For forming the rear support 342, the rear recesses are first filled with silicon rubber liquid, and, then, silicone rubber liquid is applied over, or a silicone rubber sheet may be disposed on, the rear surfaces of the rear block supports 321, 322, . . . , 328 to thereby form the silicone rubber layer. In this case, the edges of the rear block supports 321, 322, . . . , 328 may be pressed and bent toward the front side, as in FIG. 7C. The silicone rubber fillers 344 may be formed integral with the rear support 342. The silicone rubber is cured after filling or being applied. The silicone rubber fillers 344 increase the coupling between the gas discharge tubes at the edges of the rear block supports 321, 322, . . . , 328, resulting in intimate contact of the signal electrodes 3 with the gas discharge tubes.

In FIG. 9B, the display device 108 can be easily curved to make the front side of the display device 108 concave. Since silicone rubber is an elastic material, it can be stretched, while holding the rear block supports 321, 322, . . . , 328 in a satisfactory condition even when the front-side surface of the display device 108 is concave. Thus, the display device 108 having a curved display surface can be provided.

Figure 10A:
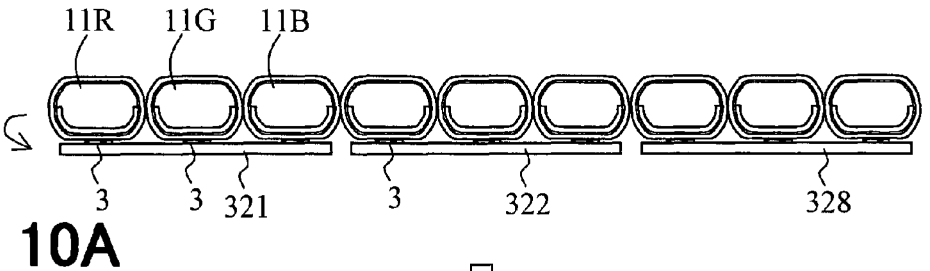
FIGS. 10A and 10B illustrate a procedure for manufacturing the display device of FIG. 6.
Figure 10B:
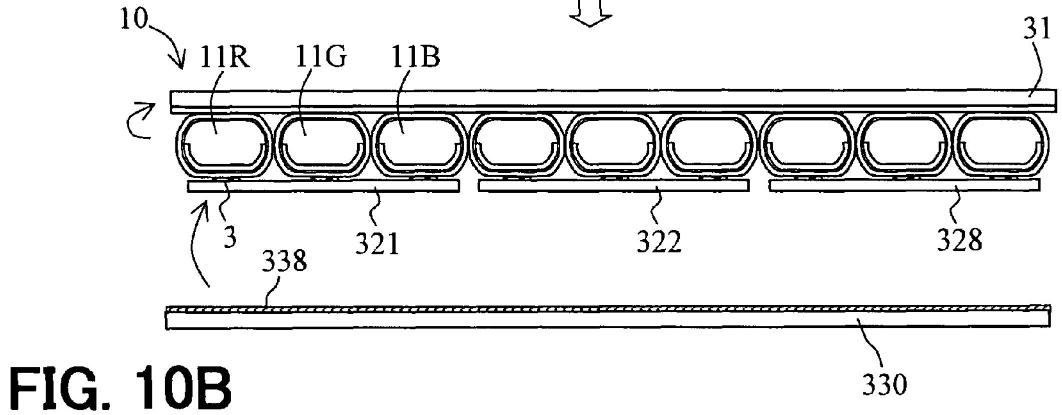

FIGS. 10A and 10B illustrate a procedure for manufacturing the display device 102 of FIG. 6. For assembling the display device 106, the gas discharge tubes are disposed in groups (11R, . . . , 11B), . . . , with their rear surfaces contacted with the signal electrodes 3 on the corresponding rear block supports 321, 322, . . . , and 328, and, then, bonded together. After that, as shown in the upper portion of FIG. 10B, the display device structure 10 is assembled by bonding the front-side surfaces of the groups of gas discharge tubes (11R, . . . , 12R) to the front support 31. Then, as shown in FIG. 10B, the adhesive layer 338 of the rear support 330 shown in FIG. 8B is bonded to the rear-side surfaces of the rear block supports 321, 322, . . . , and 328 of the display device structure 10, whereby the display device 102 of FIG. 6 has been assembled.

Figure 11A:
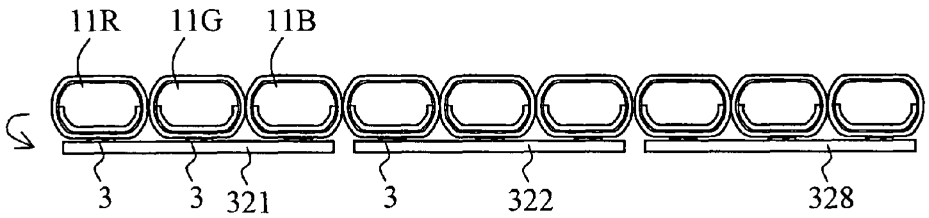
FIGS. 11A and 11B illustrate another procedure for manufacturing the display device of FIG. 6.
Figure 11B:
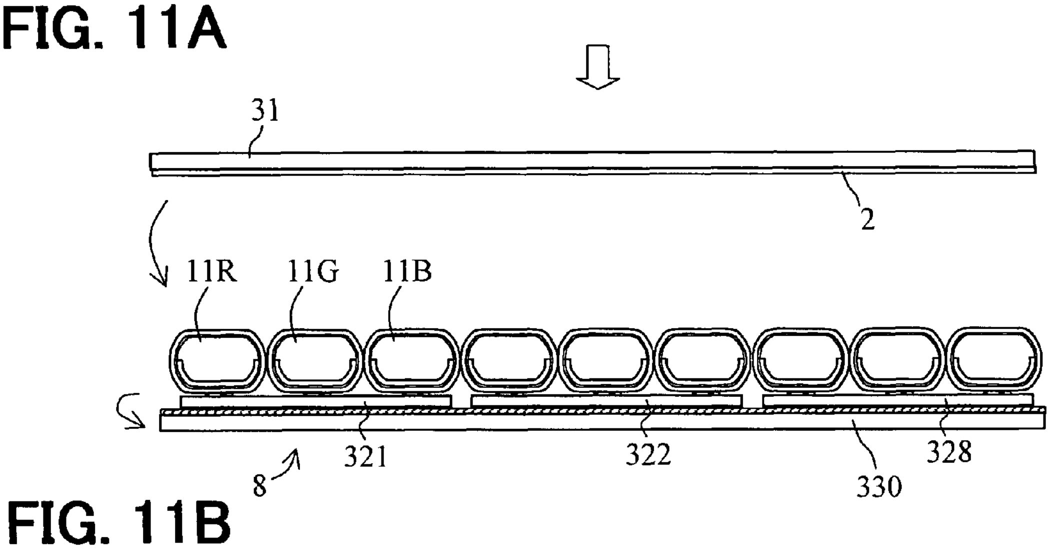

FIGS. 11A and 11B illustrate another procedure for manufacturing the display device 102 of FIG. 6. For assembling the display device 102, the gas discharge tubes are disposed in groups (11R, . . . , 11B), . . . , with their rear surfaces contacted with the signal electrodes 3 on the corresponding rear block supports 321, 322, . . . , and 328, and, then, bonded together, as shown in FIG. 11A. After that, as shown in the lower portion of FIG. 11B, a display device structure 8 is assembled by bonding the adhesive layer 338 of the rear support 330 of FIG. 8B to the rear surfaces of the rear block supports 321, 322, . . . , and 328 with the gas discharge tubes bonded thereto. After that, the front-side surfaces of the groups of gas discharge tubes (11R, . . . , 11B) of the structure are bonded to the rear-side surface of the front support 31, which results in the display device 102 of FIG. 6.

Figure 12A:
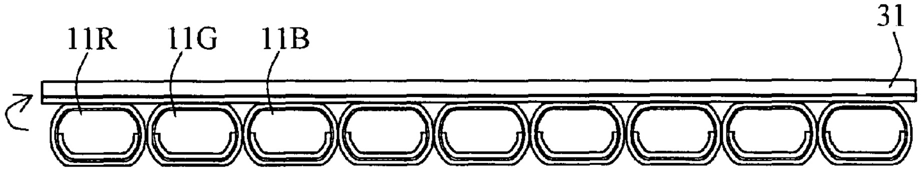
FIGS. 12A and 12B show a further procedure for manufacturing the display device of FIG. 6.
Figure 12B:
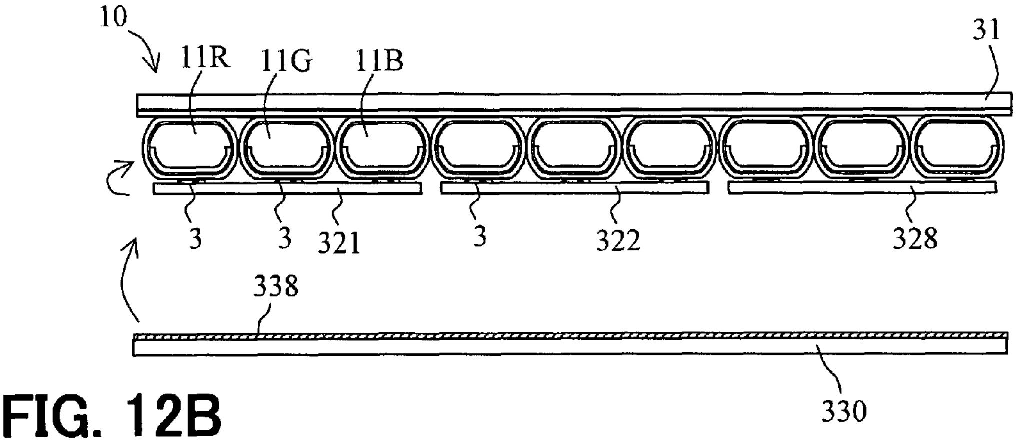

FIGS. 12A and 12B show a further procedure for manufacturing the display device 102 of FIG. 6. For assembling the display device 102, the front-side surfaces of the respective groups of gas discharge tubes (11R, . . . , 11B), . . . , are successively bonded to the front support 31, as shown in FIG. 12A. After that, as shown in the upper portion of FIG. 12B, the display device structure 10 is assembled by so disposing the signal electrodes 3 on the respective rear block supports 321, 322, . . . , and 328 in groups as to contact the rear-side surfaces of the gas discharge tubes (11R, . . . , 11B), . . . , in the corresponding groups, and bonding the signal electrodes 3 and the gas discharge tubes together. After that, as shown in FIG. 12B, the adhesive layer 338 on the rear support 330 of FIG. 8B is bonded to the rear-side surfaces of the rear block supports 321, 322, . . . , and 328 of the display device structure 10, which results in the display device 102 of FIG. 6.

The above-described embodiments are only typical examples, and their combination, modifications and variations are apparent to those skilled in the art. It should be noted that those skilled in the art can make various modifications to the above-described embodiments without departing from the principle of the invention and the accompanying claims.

What is claimed is:

1. A display device with a plurality of elongated gas discharge tubes disposed side by side, the display device comprising:

a front support member and a plurality of rear support members separated from each other with a gap disposed between edges of adjacent rear support members, the plurality of elongated gas discharge tubes being sandwiched between the front support member and the plurality of separate rear support members;

a plurality of display electrodes formed on a surface of the front support member facing the plurality of elongated gas discharge tubes to extend across tube axes of the plurality of elongated gas discharge tubes;

a plurality of signal electrodes formed on surfaces of that plurality of rear support members facing the plurality of elongated gas discharge tubes to extend along the longitudinal direction of the plurality of elongated gas discharge tubes, so that each separate rear support member is associated with corresponding signal electrodes of the plurality of signal electrodes; and another rear support member supporting the plurality of separate rear support members, the other rear support member being disposed on surfaces of the plurality of rear support members that are opposite to the surfaces thereof facing the plurality of elongated gas discharge tubes.

2. The display device according to claim 1, wherein each of the separate rear support members comprise a flexible sheet, and further comprise members projecting from the separate rear support sheets that are disposed on edges of the separate rear support sheets extending in the longitudinal direction of the plurality of elongated gas discharge tubes.

3. The display device according to claim 1, wherein each of the separate rear support members comprises a flexible sheet, and the display device further comprises fillers disposed in spaces formed between front-side surfaces of edges of the plurality of separate rear support sheets extending in the longitudinal direction of the plurality of elongated gas discharge tubes and outer peripheral surface portions of the plurality of elongated gas discharge tubes disposed near the edges.

4. The display device according to claim 1, wherein the other rear support member has a higher reflectivity than the front support member.

5. The display device according to claim 1, wherein the other rear support member has a lower dielectric constant than the front support member.

6. A display device, comprising:

an array of elongated gas discharge tubes disposed side by side;

a front support sheet which has a rear-side surface bonded to a front side of the array of elongated gas discharge tubes and has a plurality of display electrodes formed on the rear-side surface thereof to extend across a longitudinal direction of the elongated gas discharge tubes of the array of elongated gas discharge tubes;

a rear support which comprises a plurality of block support sheets separated from each other with a gap disposed between edges of adjacent block support sheets disposed along the longitudinal direction of the elongated gas discharge tubes; and a common rear support member attached to rear-side surfaces of the block support sheets, wherein the block support sheets have front-side surfaces bonded to a rear side of the array of elongated gas discharge tubes and have respective groups of signal electrodes formed on the respective front-side surfaces thereof along the longitudinal direction of the elongated gas discharge tubes, and each group of signal electrodes comprises a same number of signal electrodes for corresponding ones of the elongated gas discharge tubes.

7. The display device according to claim 6, wherein the number of signal electrodes in each group is an integer multiple of three.

8. The display device according to claim 6, wherein adjacent ones of the elongated gas discharge tubes contact each other, and a space between adjacent ones of the block support sheets absorbs misregistrations between the signal electrodes and the elongated gas discharge tubes.

9. The display device according to claim 7, wherein adjacent ones of the elongated gas discharge tubes contact each other, and a space between adjacent ones of the block support sheets absorbs misregistrations between the signal electrodes and the elongated gas discharge tubes.

* * * * *